United States Patent Office 3,184,334
Patented May 18, 1965

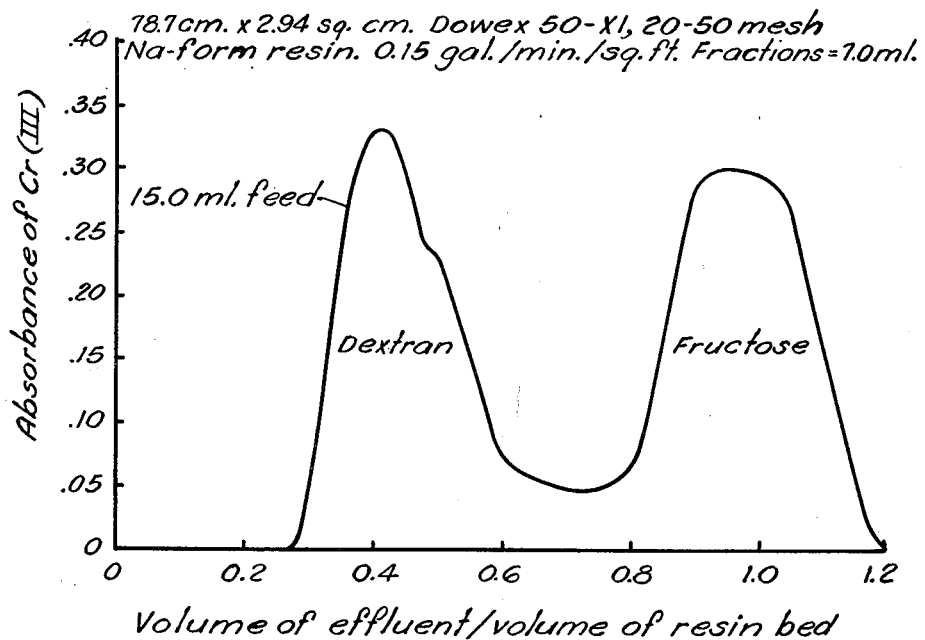

3,184,334
SEPARATION OF DEXTRAN FROM FRUCTOSE USING ION EXCHANGE RESINS
Roger N. Sargent, Midland, Mich., assignor to The Dow Chemical Company, Midland, Mich., a corporation of Delaware
Filed Apr. 30, 1962, Ser. No. 190,919
5 Claims. (Cl. 127—46)

This invention concerns an improved method for separating dextran from fructose wherein ion exchange resins are used as separating media.

Until the present invention, it was not known that dextran, a glucose polymer having a molecular weight of the order of one million, could be separated from fructose by using ion exchange resins as selective sorbents. Both the high molecular weight dextran and the hexose, fructose, are nonionic in nature, consequently it was not apparent from the knowledge of ion exclusion and ion exchange techniques that such a separation would be feasible.

Dextran is most conveniently produced by the enzymatic fermentation of sucrose, a disaccharide which contains the units of glucose and fructose joined by a glucosidic linkage. During the enzymatic fermentation of sucrose, the glucose units polymerize to form dextran, a polymer having a molecular weight of about one million. At the same time, fructose is liberated. Fructose represents about half of the solids content of the aqueous fermentation liquor. In addition to dextran and fructose, the fermentation liquor contains minor amounts of $K_2HPO_4$, yeast extract and "R salts" which are sulfate and chloride salts of magnesium, sodium, Fe(II) and Mn(II).

Pursuant to this invention, it has now been discovered that dextran can be separated from its aqueous solutions also containing fructose by contacting such an aqueous solution with a water-swollen, water-immersed, acid-form, alkali metal, ammonium or alkaline earth metal salt of an acidic cation exchange resin or of a water-swollen, water-immersed anion exchange resin in a salt form. The fructose is thereby sorbed in and held by the water-swollen resin particles or beads while the dextran remains dissolved in the aqueous phase surrounding the resin particles or beads. Thereafter, a water wash, advantageously with distilled or deionized water, is used to elute first the dextran which is excluded by the water-swollen resin particles, followed by the fructose which is preferentially retained by the water-swollen resin particles. It appears that the separation so described is made possible by the fact that while both dextran and fructose are water soluble, the size of the dextran molecule is such that it can not penetrate, and so is excluded by, the water-swollen resin particles while the fructose molecule is small enough so that it can penetrate into and be held by the water-swollen resin particles.

Aqueous solutions of dextran and fructose which can be separated into dextran and fructose and enriched fractions thereof by the process of this invention advantageously contain from about 10 to about 25 weight percent of total solutes, no more than about half of which is dextran. Preferably, no more than about 10 weight percent of dextran should be present in the aqueous solution, since the viscosity of dextran increases greatly, due to its high molecular weight, as the dextran content of the solution increases above 5 weight percent. If higher concentrations of dextran than 5 percent are contemplated, then it becomes advisable to heat such solutions to reduce their viscosity to an operable level. Generally, heating to 30° to 90° C. will suffice when aqueous solutions containing more than 5 weight percent of dextran are being processed.

All known ion exchange resins originally in a salt form and acid-form cation exchange resins (which, when they have an alkenylaryl matrix, are crosslinked in amount from about 0.5 to 4 weight percent as to the matrix resin, i.e., the resin on which the ion exchanging groups are substituted) are operable in the process of this invention. Such resins are used in the water-swollen form, the water content of which generally ranges between about 40 and about 80 weight percent, water-swollen resin basis, advantageously in particulate or bead form, as beds of resin through which feed and water are fed alternately. Such resins include both anionic and cationic types.

Examples of cation exchange resins useful in the process of this invention are sulfonated phenolformaldehyde resins, sulfonated copolymers of monoalkenyl aromatic hydrocarbons with from 0.5 to 4 weight percent of a dialkenyl crosslinking compound, e.g., divinylbenzene, such as are disclosed in U.S. Patent No. 2,366,007 and carboxylate resins such as are disclosed in U.S. Patent No. 2,471,818. These resins are useful in acid form or in an alkali metal, ammonium or alkaline earth metal salt form.

Examples of suitable anion exchange resins which can be employed in the process of this invention are the resinous condensation products of phenolformaldehyde and polyalkylene polyamines, which are disclosed in U.S. Patent No. 2,341,907; the resinous condensation products of phenol, alkylene polyamines and ammonia or an ammonium salt, which are disclosed in U.S. Patent No. 2,546,938; resinous quaternary ammonium salts such as those of the reaction product of a tertiary amine and an insoluble crosslinked copolymer of a monovinyl aromatic hydrocarbon and a divinyl aromatic hydrocarbon, which copolymer contains halomethyl groups on its aromatic nuclei, which are described in U.S. Patent No. 2,591,573; and the resinous reaction products of a primary amine or a secondary amine and such last-mentioned copolymer, described in U.S. Patent No. 2,591,574. The anion exchange resins are always employed in the salt form, e.g., chloride, bromide, nitrate, etc.

In practice, an aqueous solution of dextran and fructose is fed slowly (to prevent mixing with interstitial water) to a water-immersed bed of water-swollen beads of an ion exchange resin, as specified, until the water surrounding the water-swollen beads is displaced. Thereby fructose migrates into and is rapidly sorbed by the water-swollen resin beads while the remaining dextran solution stays in the interstitial space. Thereafter, water is fed to the resin column to elute dextran or a dextran-enriched fraction followed by fructose or a fructose-enriched fraction. The cycles of feeding and eluting are continued with the same resin bed.

When dextran and fructose are separated from aqueous fermentation liquor resulting from the enzymatic fermentation of sucrose, the minor amounts of $K_2HPO_4$ and R salts present therein gradually convert the cation exchange resin bed from its original form to a mixture of salts of potassium, magnesium, sodium, Fe(II) and Mn(II). The amount of each of such resin salts so formed is dependent upon the concentration of their cations in the fermentation liquor and upon resin selectivity for the specific metals. The mixed resin salts so formed have no detrimental effect upon the process of the invention.

The following examples describe completely representative specific embodiments and the best mode contemplated by the inventor of carrying out the invention. The examples are not intended to be limitative of the invention other than as claimed herein.

of 0.5 g.p.m./ft.$^2$. Approximately 10 ml. cuts of effluent from the column were collected and analyzed by oxidation with dichromate (ibid.). In the following table, the value V refers to the volume of effluent from the column (in mls.) and A refers to the absorbance of Cr(III) which is directly proportional to the quantity of solute in the sample. All resins were 50–100 U.S. mesh size.

*Table*

| Dowex 50W-X1 Resin | | | | | | | | Dowex 1-X1 Resin | |
|---|---|---|---|---|---|---|---|---|---|
| Na+ 82.0% H$_2$O | | K+ | | Ca++ | | Sr++ 64.3% H$_2$O | | Cl- 85.2% H$_2$O | |
| V | A | V | A | V | A | V | A | V | A |
| 28.5 | .021 | 19.2 | +.005 | 19.8 | .003 | 19.4 | .009 | 20.6 | .005 |
| 36.9 | .462 | 29.2 | -.005 | 29.8 | .000 | 29.1 | .005 | 29.4 | .000 |
| 45.5 | .684 | 37.3 | +.210 | 38.8 | .258 | 39.3 | .310 | 40.9 | .212 |
| 52.5 | .230 | 47.2 | .490 | 49.2 | .515 | 47.8 | .388 | 50.6 | .441 |
| 60.6 | .014 | 55.9 | .371 | 59.5 | .056 | 58.0 | .231 | 59.7 | .180 |
| * | | 65.7 | .194 | 69.7 | .014 | 67.4 | .051 | 68.8 | .041 |
| | | 74.9 | .048 | | | | | | |
| 68.9 | .036 | | | 80.0 | .075 | 76.9 | .077 | 78.5 | .130 |
| 76.9 | .120 | 84.2 | .150 | 90.0 | .222 | 85.7 | .190 | 88.2 | .278 |
| 85.2 | .279 | 94.2 | .273 | 99.8 | .289 | 95.7 | .282 | 97.8 | .332 |
| 93.9 | .368 | 102.8 | .338 | 109.7 | .230 | 105.6 | .279 | 107.8 | .246 |
| 101.2 | .349 | 112.6 | .286 | 119.7 | .100 | 115.5 | .181 | 116.5 | .091 |
| 109.7 | .188 | 121.0 | .150 | 129.1 | .020 | 125.5 | .055 | 126.0 | .023 |
| 117.1 | .079 | 131.0 | .039 | 139.0 | .000 | 133.7 | .028 | 135.5 | .010 |
| 125.3 | .026 | 140.3 | -.001 | 149.2 | -.003 | 143.2 | .016 | 141.5 | .008 |
| 133.9 | .010 | | | | | | | | |

*Dividing line between dextran and fructose fractions, the dextran fraction being above the line

EXAMPLE 1

A 15 ml. quantity of Leuconostock fermented sucrose liquor containing 5 percent dextran and 5 percent fructose was passed through a 232 ml. (78.7 cm. x 2.94 cm.$^2$) bed of Dowex 50–X1, 20–50 U.S. mesh size sulfonated cation exchange resin originally in the sodium form at a flow rate of 0.15 g.p.m./ft.$^2$ followed by a water eluant. The eluate was collected in fractions or cuts of 7.0 ml. and analyzed for its solute content by oxidation with chromic acid by the method of R. Sargent and W. Rieman, Anal. Chim. Acta, 14, 381 (1956).

| Cut No.: | Absorbance of Cr(III) | |
|---|---|---|
| 9 | .000 | |
| 10 | .011 | |
| 11 | .125 | |
| 12 | .250 | |
| 13 | .315 | |
| 14 | .331 | |
| 15 | .298 | Dextran |
| 16 | .237 | |
| 17 | .208 | |
| 18 | .155 | |
| 19 | .105 | |
| 20 | .070 | |
| 22 | .054 | |
| 24 | .049 | |
| 26 | .063 | |
| 28 | .161 | |
| 30 | .294 | |
| 32 | .301 | Fructose |
| 34 | .285 | |
| 36 | .161 | |
| 39 | .033 | |

This separation was graphed in the accompanying figure.

EXAMPLE 2

The separations as reported below were all run using a 100 ml. 74.2 cm. x 1.348 cm.$^2$ resin bed in the specified ionic form. A 1.0 ml. sample of an aqueous synthetic mixture containing 5 percent dextran and 5 percent fructose was fed to the resin bed followed by elution with a water eluant at room temperature and a flow rate Advantageous results are also obtained with other forms of ion exchange resins. However, the separations obtained using resins crosslinked with one weight percent crosslinking agent were superior to those obtained using more highly crosslinked resins containing up to 4 weight percent crosslinking agent.

What is claimed is:

1. A method for separating dextran from fructose by
   (1) feeding to a water-immersed bed of water-swollen ion exchange resin particles of the group consisting originally of salt-form anion exchange resins and acid- and salt-form cation exchange resins
      (a) an aqueous solution of dextran and fructose to displace from the bed of resin an equal volume of water
      (b) whereby the fructose is selectively sorbed by the water-swollen resin particles and
   (2) feeding water to the resin bed to displace an effluent from the resin bed as a dextran-enriched fraction followed by a fructose-enriched fraction.

2. A method wherein the steps of claim 1 are repeated
   (1) using a further amount of the starting solution and
   (2) the same bed of ion exchange resin.

3. A method as claimed in claim 1
   (1) wherein the ion exchange resin is a sulfonated copolymer of styrene containing from 0.5 to 4 mole percent of combined divinylbenzene, total styrene and divinylbenzene basis, and
   (2) wherein the resin originally is a salt form of the group consisting of alkali metal, ammonium and alkaline earth metal salts.

4. A method as claimed in claim 1
   (1) wherein the ion exchange resin is an anion exchange resin of the group consisting of quaternary ammonium and amine salt resins,
      (a) the base resin to which ion exchanging groups have been attached being a copolymer of styrene containing from 0.5 to 4 mole percent of combined divinylbenzene, total styrene and divinylbenzene basis.

5. The method of claim 1
   (1) wherein the resin is a quarternary ammonium salt resin, (a) the base resin to which ion exchanging groups have been attached being a copolymer of styrene containing from 0.5 to 4 mole percent of combined divinylbenzene, total styrene and divinylbenzene basis.

References Cited by the Examiner

UNITED STATES PATENTS

| | | | |
|---|---|---|---|
| 2,686,777 | 8/54 | Wimmer | 260—234 |
| 2,890,972 | 6/59 | Wheaton | 127—46.2 |
| 2,943,003 | 6/60 | Itin | 127—46.1 |
| 3,002,823 | 10/61 | Flodin et al. | 260—209 |
| 3,044,904 | 7/62 | Serbia | 127—30 X |
| 3,044,905 | 7/62 | Lefevre | 127—30 X |

OTHER REFERENCES

Noggle et al.: Archives Biochem. and Biophysics, November 1959, vol. 41:1, pages 21–28.

Article—Treatment of Sugar Juices—in the text, "Principles of Sugar Solution," edited by Pieter Honig, Elsevier Publishing Company, 1953, pages 732–741 relied upon.

MORRIS O. WOLK, *Primary Examiner.*